(12) United States Patent
Miyazaki

(10) Patent No.: US 9,840,433 B2
(45) Date of Patent: Dec. 12, 2017

(54) CONDUCTIVE PASTE AND MULTILAYER CERAMIC ELECTRONIC COMPONENT

(71) Applicant: Murata Manufacturing Co., Ltd., Nagaokakyo-shi, Kyoto-fu (JP)

(72) Inventor: Tomochika Miyazaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 80 days.

(21) Appl. No.: 14/886,304

(22) Filed: Oct. 19, 2015

(65) Prior Publication Data

US 2016/0039711 A1   Feb. 11, 2016

Related U.S. Application Data

(63) Continuation of application No. PCT/JP2014/059520, filed on Mar. 31, 2014.

(30) Foreign Application Priority Data

Apr. 25, 2013  (JP) ................................. 2013-092140

(51) Int. Cl.
  *C03C 4/14*     (2006.01)
  *H01G 4/232*    (2006.01)
  (Continued)

(52) U.S. Cl.
  CPC .............. *C03C 4/14* (2013.01); *C03C 3/064* (2013.01); *C03C 3/066* (2013.01); *C03C 8/16* (2013.01);
  (Continued)

(58) Field of Classification Search
  None
  See application file for complete search history.

(56) References Cited

U.S. PATENT DOCUMENTS 4,400,214 A * 8/1983 Ogawa ................ C22C 32/0089
                                                      106/1.13
7,476,342 B2 * 1/2009 Endo ...................... H01C 7/003
                                                      252/518.1
(Continued)

FOREIGN PATENT DOCUMENTS

JP   S58-100306 A   6/1983
JP   H03-186640 A   8/1991
(Continued)

OTHER PUBLICATIONS

Machine generated English language Translation of JP 2008-130270.*
(Continued)

*Primary Examiner* — Dion R Ferguson
(74) *Attorney, Agent, or Firm* — Arent Fox LLP

(57) ABSTRACT

A conductive paste for forming external electrodes for a multilayer ceramic electronic component. The paste contains a glass composition containing (a) BaO, (b) at least one of SrO and CaO, (c) ZnO, (d) $B_2O_3$, and (e) at least one selected from the group consisting of $SiO_2$, $Al_2O_3$, and $TiO_2$, in which the total content percentage of BaO, SrO, and CaO is 30 mol % or more, the molar ratio represented by $B_2O_3/(SiO_2+Al_2O_3+TiO_2)$ is 0.7 to 1.5, and the content percentage of ZnO is 0 to 5 mol %.

9 Claims, 2 Drawing Sheets

(51) Int. Cl.
    *C03C 8/16*    (2006.01)
    *C03C 8/18*    (2006.01)
    *H01B 1/20*    (2006.01)
    *C03C 3/064*   (2006.01)
    *C03C 3/066*   (2006.01)
    *H01G 4/008*   (2006.01)
    *H01G 4/012*   (2006.01)
    *H01G 4/12*    (2006.01)
    *H01G 4/30*    (2006.01)

(52) U.S. Cl.
    CPC .............. *C03C 8/18* (2013.01); *H01B 1/20* (2013.01); *H01G 4/008* (2013.01); *H01G 4/012* (2013.01); *H01G 4/12* (2013.01); *H01G 4/2325* (2013.01); *H01G 4/30* (2013.01)

(56) References Cited

U.S. PATENT DOCUMENTS

| | | | | |
|---|---|---|---|---|
| 8,808,582 B2* | 8/2014 | Hamada | ................... | C03C 8/02 |
| | | | | 252/512 |
| 2004/0144962 A1* | 7/2004 | Hayakawa | ........... | H01G 4/2325 |
| | | | | 252/500 |
| 2007/0018776 A1* | 1/2007 | Tanaka | ............. | H01C 17/06533 |
| | | | | 338/22 R |
| 2007/0128450 A1* | 6/2007 | Mori | ....................... | C03C 3/066 |
| | | | | 428/432 |
| 2009/0226705 A1* | 9/2009 | Motoki | .................. | H01G 4/232 |
| | | | | 428/323 |
| 2012/0154977 A1* | 6/2012 | Hur | .......................... | H01B 1/16 |
| | | | | 361/303 |

FOREIGN PATENT DOCUMENTS

| | | |
|---|---|---|
| JP | 2005-019135 A | 1/2005 |
| JP | 2005-228904 A | 8/2005 |
| JP | 2003-077333 A | 9/2007 |
| JP | 2007-238408 A | 9/2007 |
| JP | 2008-130720 A | 6/2008 |

OTHER PUBLICATIONS

Machine generated English language Translation of JP 2008-130270 (May 6, 2008).*
International Search Report issued for PCT/JP2014/059520, dated Jul. 1, 2014.
Written Opinion of the International Searching Authority issued for PCT/JP2014/059520, dated Jul. 1, 2014.

* cited by examiner

CONDUCTIVE PASTE AND MULTILAYER CERAMIC ELECTRONIC COMPONENT

CROSS REFERENCE TO RELATED APPLICATIONS

The present application is a continuation of International application No. PCT/JP2014/059520, filed Mar. 31, 2014, which claims priority to Japanese Patent Application No. 2013-092140, filed Apr. 25, 2013, the entire contents of each of which are incorporated herein by reference.

FIELD OF THE INVENTION

The present invention relates to a conductive paste and a multilayer ceramic electronic component, and more particularly to a conductive paste for use in forming external electrodes of multilayer ceramic electronic components, and a multilayer ceramic electronic component with external electrodes formed with the use of the paste.

BACKGROUND OF THE INVENTION

As one of typical ceramic electronic components, there is a multilayer ceramic capacitor that has a structure as shown in, for example, FIG. 2.

This multilayer ceramic capacitor is, as shown in FIG. 2, structured to have external electrodes 54 (54a, 54b) provided, so as to be electrically connected to a plurality of internal electrodes 52 (52a, 52b), on both end surfaces 53a, 53b of a ceramic laminate (ceramic body) 60 obtained by laminating the internal electrodes 52 (52a, 52b) with ceramic layers 51 as dielectric layers interposed therebetween.

Now, in the case of manufacturing such a multilayer ceramic capacitor, it is common that the external electrodes (54a, 54b) are formed by a method of applying a conductive paste to both end surfaces of a ceramic laminate (ceramic body) and firing the paste.

As a conductive paste for use in the formation of such external electrodes, for example, a conductive paste including at least a metal powder and BaO—SrO—ZnO—$B_2O_3$—$SiO_2$ based glass frit is proposed, in which the glass frit contains BaO: 10 to 50 weight %, SrO: 5 to 40 weight %, ZnO: 10 to 30 weight %, $B_2O_3$: 15 to 30 weight %, and $SiO_2$: 3 to 20 weight % in terms of oxide, and the glass frit is contained at 0.5 to 10 weight % with respect to 100 weight % of the metal powder (see Patent Document 1).

Further, the formation of external electrodes with the use of the conductive paste is supposed to make the glass frit less likely to penetrate into the ceramic constituting the ceramic laminate during firing.

In addition, multilayer ceramic capacitors with external electrodes formed with the use of the conductive paste are supposed to be high in flexure strength and excellent in insulation resistance in high temperature load tests.

However, the conductive paste in Patent Document 1 has the problem of, because of the high ZnO content, making the ZnO likely to be eluted from the external electrodes into a plating solution when the external electrodes are subjected to Ni plating, Sn plating, or the like, and causing ingress of the plating solution from voids after the ZnO elution into the ceramic body constituting the multilayer ceramic capacitor, thereby decreasing the flexure strength of the multilayer ceramic capacitor.

In addition, the proportions of the $SiO_2$ and $B_2O_3$ constituting the glass frit affect not only the plating resistance (plating solution resistance) of external electrodes formed, but also glass flotation of the glass component floated on the surfaces of the external electrodes and the densification of the external electrodes. In contrast, Patent Document 1 is not necessarily intended to clearly specify preferred proportions of the $SiO_2$ and $B_2O_3$, it is thus difficult to achieve a balance among the plating resistance, the suppression of glass flotation, and the densification of external electrodes, and when external electrodes are formed with the use of the conductive paste in Patent Document 1, problems may be caused such as defective plating due to glass flotation and defective external connections. In addition, there are problems such as characteristics degraded or cracks caused by penetration of a plating solution or a cleaning solution from poorly densified external electrodes into the ceramic body constituting the multilayer ceramic electronic component.

Moreover, when the glass component in the external electrodes has an inappropriate composition, the glass component reacts with the ceramic constituting the ceramic body to form a reaction layer, thereby resulting in problems of crack generation and degraded flexure strength.

Patent Document 1: Japanese Patent Application Laid-Open No. 2003-77336

SUMMARY OF THE INVENTION

The present invention is intended to solve the problems mentioned above, and an object of the invention is to provide a conductive paste capable of forming external electrodes which are excellent in plating resistance, dense, and able to suppress or prevent glass flotation, when the paste is used to form the external electrodes for a multilayer ceramic electronic component, and a highly reliable multilayer ceramic electronic component with favorable characteristics, which includes external electrodes formed with the use of the conductive paste.

In order to solve the problems mentioned above, the conductive paste according to the present invention is a conductive paste including a glass composition for use in forming an external electrode of a multilayer ceramic electronic component, the glass composition containing:

(a) BaO;
(b) at least one of SrO and CaO;
(c) ZnO;
(d) $B_2O_3$; and
(e) at least one selected from the group consisting of $SiO_2$, $Al_2O_3$, and $TiO_2$.

The total content percentage of BaO, SrO, and CaO is 30 mol % or more with respect to the total amount of the glass composition, the molar ratio represented by $B_2O_3/(SiO_2+Al_2O_3+TiO_2)$ is 0.7 to 1.5, and the content percentage of ZnO is 0 to 5 mol % with respect to the total amount of the glass composition.

In the conductive paste according to the present invention, the glass composition preferably contains no ZnO.

When ZnO is not contained, it becomes possible to suppress or prevent the elution of the glass component into plating solutions in a plating step for plating external electrodes, and the plating resistance can be improved more reliably.

In addition, the molar ratio represented by $B_2O_3/(SiO_2+Al_2O_3+TiO_2)$ is preferably 0.7 to 1.0.

The molar ratio represented by $B_2O_3/(SiO_2+Al_2O_3+TiO_2)$ between 0.7 to 1.0 makes it possible to suppress or prevent glass flotation at the external electrodes, and further reliably achieve the improvement in densification, and makes it possible to achieve a highly reliable multilayer ceramic electronic component with favorable characteristics.

In the conductive paste according to the present invention, the glass composition preferably contains 20 mol % or more of $B_2O_3$.

When the glass composition contains 20 mol % or more of $B_2O_3$, the wettability to the ceramic body can be improved.

Furthermore, a multilayer ceramic electronic component according to the present invention is characterized in that it includes an external electrode formed with the use of the above-described conductive paste according to the present invention.

The conductive paste according to the present invention uses, as a glass composition, the glass composition containing (a) BaO, (b) at least one of SrO and CaO, (c) ZnO, (d) $B_2O_3$, and (e) at least one selected from the group consisting of $SiO_2$, $Al_2O_3$, and $TiO_2$, in which the total content percentage of BaO, SrO, and CaO is 30 mol % or more, the molar ratio represented by $B_2O_3/(SiO_2+Al_2O_3+TiO_2)$ is 0.7 to 1.5, and the content percentage of ZnO is 0 to 5 mol %, thus making it possible to suppress or prevent the elution of the glass component into plating solutions in a plating step for plating external electrodes formed.

In addition, the paste makes it possible to suppress or prevent glass flotation at external electrodes, and makes it possible to improve the densification of the external electrodes.

As a result, the formation of external electrodes with the use of the conductive paste according to the present invention makes it possible to achieve a highly reliable multilayer ceramic electronic component with favorable characteristics.

In the glass composition of the conductive paste according to the present invention, the oxide (BaO, SrO, CaO) of alkaline-earth metals inhibits a reaction between the glass component in the conductive paste and a ceramic constituting the multilayer ceramic electronic component, thus making it possible to prevent the strength of the ceramic body from being decreased when external electrodes are formed with the use of the conductive paste according to the present invention. The glass composition included in the conductive paste according to the present invention contains (a) the BaO and (b) the at least one of SrO and CaO in a proportion of 30 mol % or more in total, thereby serving to inhibit a reaction between the glass and ceramic body in the external electrodes. It is to be noted that in the conductive paste according to the present invention, mainly the BaO inhibits the reaction with the ceramic body to serve to prevent the strength of the ceramic body from being decreased.

In the glass composition of the conductive paste according to the present invention, controlling the molar ratio of $B_2O_3/(SiO_2+Al_2O_3+TiO_2)$ makes it possible to control the wettability of the ceramic body. In addition, the molar ratio of $B_2O_3/(SiO_2+Al_2O_3+TiO_2)$ within the range of 0.7 to 1.5 makes it possible to ensure wettability to the ceramic body while suppressing glass flotation, and suppress the generation of voids, thereby forming dense electrodes with favorable plating attachment.

In controlling the molar ratio of $B_2O_3/(SiO_2+Al_2O_3+TiO_2)$ to achieve desired characteristics, ZnO is likely to be dissolved in plating solutions, and the increased proportion of ZnO causes a problem of leading to deterioration of plating resistance. In addition, because firing in a reducing atmosphere causes reduction and sublimation of ZnO, the proportion of ZnO is preferably 5 mol % or less, and more desirably, ZnO is not contained.

Furthermore, the conductive paste according to the present invention can contain, to the extent that the glass property is not affected (the total of the following oxides is 1 mol % or less), alkali/alkaline-earth metal oxides such as $Li_2O$, $Na_2O$, $K_2O$, and MgO, and transition metal oxides such as MnO, CoO, NiO, CuO, $SnO_2$, and $ZrO_2$.

Functional effects achieved by the use of the conductive paste according to the present invention will be further described below.

The BaO and at least one of SrO and CaO, which constitute the glass composition included in the conductive paste according to the present invention, forms an interfacial structure from which glass is less likely to penetrate into the ceramic body, thereby suppressing a decrease in strength due to ceramic alteration.

CaO is desirably contained in advance in the glass, because, for example, when a dielectric ceramic containing CaO (such as $CaZrO_3$) is used, the CaO in the ceramic diffuses into the glass to serve to suppress variation in glass property. On the other hand, CaO is likely to be eluted into plating solutions, the excessively increased content ratio of CaO will deteriorate the plating resistance of the glass itself. Therefore, from the perspective of ensuring plating resistance, the proportion of CaO is desirably adjusted in an appropriate manner.

It is to be noted that the adoption, as a main modifier oxide, of BaO that is less likely to be dissolved in plating solutions can suppress BaO elution.

$B_2O_3$ is used as a main constituent of sintering aid glass in electrodes, because of $B_2O_3$ forms a glass skeleton and lowers the softening point of the glass, but required to be used in combination with other skeleton constituent ($SiO_2$, $Al_2O_3$, $TiO_2$) because $B_2O_3$ has low chemical durability.

$SiO_2$ forms a glass skeleton with high acid resistance, which has a rigid structure, and thus has a tendency to increase the softening point of the glass, and deteriorate the wettability to the ceramic body when the skeleton constituent is used alone.

$Al_2O_3$ expands the extent of vitrification, and strengthens the glass skeleton mainly composed of $B_2O_3$ to improve plating resistance, but has, in the presence of an excess of $Al_2O_3$, a tendency to increase the softening point of the glass, and deteriorate the wettability to the ceramic body. Therefore, the ratio of $Al_2O_3$ is limited depending on the relationship with the other constituents such as $B_2O_3$.

Further, the above-mentioned $SiO_2$ also contribute improvement in plating resistance, but in the presence of an excess of $SiO_2$, deteriorates the wettability to the ceramic body, and thus, depending on the relationship with the other constituents such as $B_2O_3$, the ratio of $SiO_2$ is limited.

$TiO_2$ serves to strengthen the glass skeleton, and improves the plating resistance. However, when the proportion is excessive, the softening point of the glass is increased to deteriorate the wettability to the ceramic body, and crystallization may be caused to block densification of the electrodes. Thus, depending on the relationship with the other constituents, an appropriate proportion of $TiO_2$ is required.

Furthermore, limiting the content ratios of the ZnO and alkali metal oxide which are likely to be eluted into plating solutions can improve plating resistance, and prevent the interfaces between the ceramic and the external electrodes from being eroded by plating solutions.

It is to be noted that when ZnO is substantially not contained, it becomes possible to keep or prevent the glass composition from varying due to the reduction action during firing, and ease of maintenance from deteriorating due to ZnO deposition in the furnace.

The multilayer ceramic electronic component according to the present invention includes the external electrodes formed with the use of the above-described conductive paste according to the present invention, thus suppressing or preventing glass flotation at the external electrodes, also making it possible to make an improvement in densification, and moreover making it possible to suppress or prevent the elution of the glass component into plating solutions in plating steps. As a result, it becomes possible to provide a highly reliable multilayer ceramic electronic component with favorable characteristics.

DETAILED DESCRIPTION OF THE INVENTION

With reference to an embodiment of the present invention, features of the present invention will be described in detail below.

[Embodiment]

Figure 1:
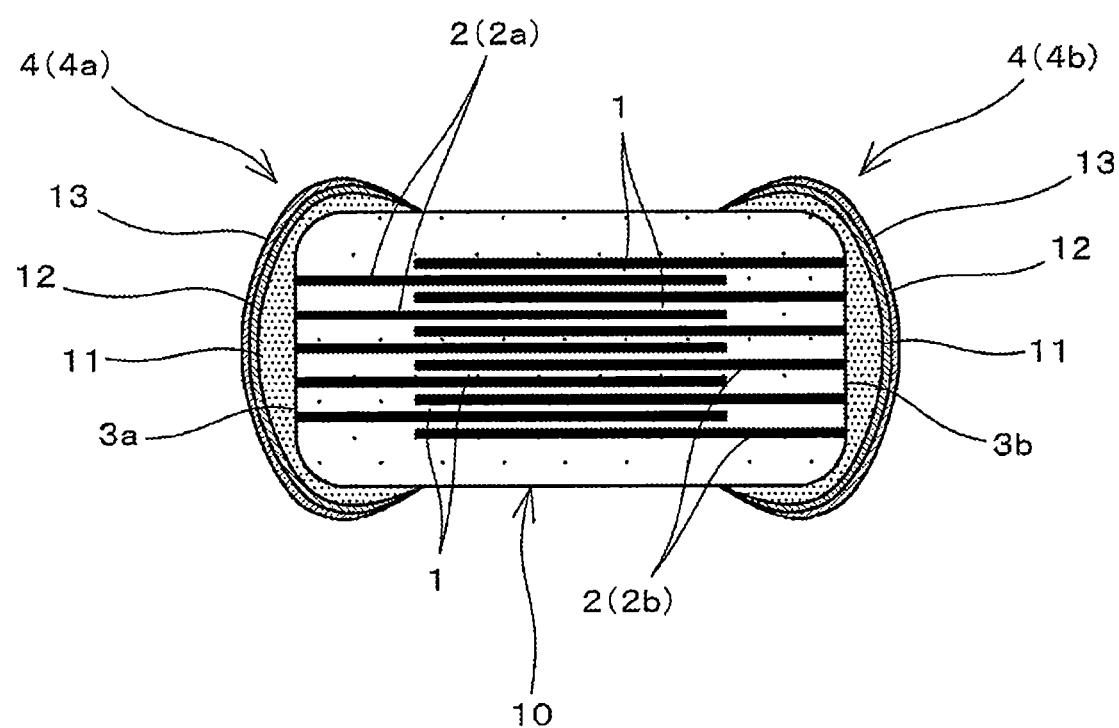
FIG. 1 is a cross-sectional view illustrating the configuration of a multilayer ceramic capacitor including external electrodes formed with the use of a conductive paste according to the present invention.
Figure 2:
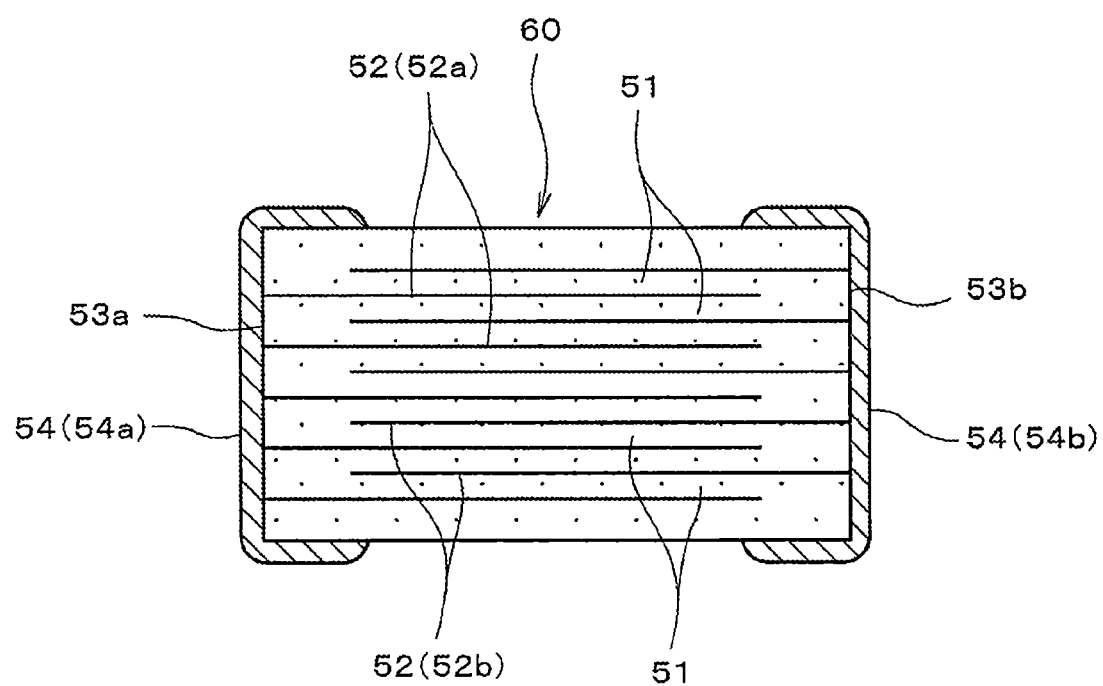
FIG. 2 is a cross-sectional view illustrating the configuration of a multilayer ceramic capacitor that is a typical multilayer ceramic electronic component.

In this embodiment, a case of manufacturing a multilayer ceramic capacitor structured as shown in FIG. 1 will be described as an example.

This multilayer ceramic capacitor is, as shown in FIG. 1, structured to have external electrodes 4 (4a, 4b) provided, so as to be electrically connected to a plurality of internal electrodes 2 (2a, 2b), on both end surfaces 3a, 3b of a ceramic laminate (multilayer ceramic capacitor element) 10 obtained by laminating the internal electrodes 2 (2a, 2b) with ceramic layers 1 as dielectric layers interposed therebetween.

The external electrodes 4 (4a, 4b) have a multi-layer structure including: an external electrode body 11 obtained by baking a conductive paste; a Ni plating film layer 12 formed on the surface of the external electrode body 11; and a Sn plating film layer 13 formed on the surface of the Ni plating film layer 12.

(The external electrode bodies 11 of) the external electrodes 4 mentioned above are formed with the use of a conductive paste prepared in the way described below.

In this embodiment, a copper powder, a glass powder, a binder (resin, solvent), and additives (dispersant, rheology controlling agents, etc.) were blended in proportions as shown in Table 1, and kneaded and dispersed to prepare a conductive paste.

Then, the prepared conductive paste was used to form external electrodes (external electrode bodies) on both of mutually opposed end surfaces of the ceramic laminate (ceramic body) constituting the multilayer ceramic capacitor.

To explain the conductive paste in more detail, a powder of 3 to 4 μm in average particle size ($D_{50}$) was used as a conductive component constituting the conductive paste in this embodiment.

In addition, as the glass powder, $BaCO_3$, $SrCO_3$, $CaCO_3$, $H_3BO_3$, $SiO_2$, $Al_2O_3$, $TiO_2$, $ZnO$, and $Na_2CO_3$ as glass raw materials were blended to provide intended compositions in terms of oxide after vitrification.

Then, the blended raw materials were mixed in a crucible, and then melted by heating to 1200 to 1400° C., and the melt was rapidly cooled with a double roll mill. Thereafter, grinding with a ball mill was carried out with zirconia as a grinding medium to prepare a glass powder of 2 μm in average particle size.

As the binder, an acrylic resin based binder with dihydroterpineol as a solvent was used.

In order to provide the conductive paste with printability, a fatty acid amide based thixotropy imparting agent was added as an additive.

Then, the copper powder, the glass powder, the binder, and the additive were mixed in respective proportions: 67 wt %; 10 wt %; 22 wt %; and 1 wt %, and dispersed with a triple roll mill to make paste form, thereby preparing the conductive paste (external electrode paste).

Then, a mother laminate was prepared by stacking green sheets with electrodes, obtained by forming an internal electrode pattern in such a way that an internal electrode paste containing nickel (Ni) as a conductive component was applied to ceramic green sheets containing barium titanate ($BaTiO_3$) as their main constituent.

Then, the mother laminate was cut in predetermined positions to be divided into individual elements (unfired ceramic laminates), and subjected to firing to obtain fired ceramic laminates (ceramic bodies), that is, laminated structures structured to have a plurality of internal electrodes laminated with dielectric ceramic layers interposed therebetween.

The conductive paste prepared in the way described above was applied by a method such as dip coating to both of mutually opposed end surfaces of the thus prepared ceramic laminates (ceramic bodies), dried, and then subjected to firing in a reducing atmosphere to form external electrodes (external electrode bodies).

Then, Ni plating film layers were formed on the surfaces of the external electrode bodies, and Sn plating film layers were further formed on the Ni plating film layers, thereby preparing multilayer ceramic capacitors according to this embodiment (samples according to Examples 1 to 6 in Table 1), structured as shown in FIG. 1. The Ni plating film layers and the Sn plating film layers were sequentially formed by an electroplating method.

For each of the samples (multilayer ceramic capacitors) prepared in the way described above, the following properties, that is, "Glass Flotation" at the external electrodes, "Presence or Absence of Void Generated" at corner parts of the external electrodes, and "Flexure Strength" of the multilayer ceramic capacitors were examined respectively by the following methods.

In addition, the plating resistance of the external electrodes were examined by the method described below.

(1) Glass Flotation

After the conductive paste applied was subjected to firing to form the external electrodes, central parts of the end surfaces of the samples (multilayer ceramic capacitors) with the external electrodes formed were observed at 500-fold or more magnification with the use of a scanning electron microscope. Then, in view of the contrasts of the images of the external electrode surfaces observed, the sample with a glass floatation part of 10 μm or more in incircle diameter (shortest) was regarded as defective (x), whereas the sample with a glass floatation part of less than 10 μm therein was regarded as non-defective (o).

(2) Void Generation (Generated or Not)

After the conductive paste applied was subjected to firing to form the external electrodes, at cut surfaces exposed by cutting the samples (multilayer ceramic capacitors) in a direction perpendicular to the end surfaces with the external electrodes formed, the cut surfaces of the external electrodes formed at four corners (corner parts) of the samples were observed at 500-fold or more magnification with the use of a scanning electron microscope. The sample without any void generation found was regarded as non-defective (O), whereas the sample with void generation found was regarded as defective (x).

(3) Flexure Strength (Rate of Flexural Crack Generation)

In accordance with the test method JIS C 60068-2-21 for the flexural capacity of printed boards, the samples (multilayer ceramic capacitors) were warped up to 1.5 mm, and the crack generation after the test was checked. Then, the proportion of cracked samples to the samples subjected to the test (Rate of Flexural Crack Generation) was figured out.

(4) Plating Resistance

In order to examine the plating resistance of the external electrodes, the glass of each composition shown in Table 1 and an acrylic resin binder were mixed at a ratio of 1:1, and dispersed with a triple roll mill to prepare a glass paste. Then, this glass paste was printed by a doctor blade method onto an alumina substrate so that the applied thickness was 20 μm or more, and subjected to firing in a reducing atmosphere.

Then, this substrate was immersed in a Ni plating solution and a Sn plating solution, and the amounts of change in weight between before and after the immersion were figured out as the amounts of dissolution. In addition, the amounts of change in weight were divided by the glass density and printed area for each substrate to be converted to the thicknesses dissolved per unit time.

It is to be noted that when the obtained values are regarded as dissolution rates in the plating solutions, the dissolution rates in the plating solutions are desirably 0.1 μm/h or less in the Ni plating solution, and desirably 1.0 μm/h or less in the Sn plating solution.

In addition, the dissolution rate in the Sn plating solution is more desirably 0.5 μm/h or less.

For the samples (Table 1) according to Examples 1 to 6 in Table 1, which meet the requirements of the present invention, Table 1 shows together evaluation results or measurement results for "Glass flotation" at the external electrodes, "Presence or Absence of Void Generated" at the corner parts of the external electrodes, "Rate of Flexural Crack Generation" for the multilayer ceramic capacitors, and "Plating Resistance" of the external electrodes, which were examined by the methods described above.

Furthermore, for comparison, comparative conductive pastes for failing to meet the requirements of the present invention were prepared in such a way that a copper powder, a glass powder, a binder, and an additive were blended, and kneaded and dispersed under the same conditions as in the case of the samples according to the examples described above, except for the use of glass powders of compositions as shown in Table 2, and the conductive pastes were used to prepare samples as comparative examples (samples according to Comparative Examples 1 to 7) (Table 2) in the same way as in the case of the samples 1 to 6 according to the examples. Then, for the samples according to Comparative Examples 1 to 7, the "Glass Flotation" at the external electrodes, "Presence or Absence of Void Generated" at the corner parts of the external electrodes, "Rate of Flexural Crack Generation" for the multilayer ceramic capacitors, and "Plating Resistance" were examined in the same way as in the case of the samples according to Examples 1 to 6.

The measurement results are shown together in Table 2.

TABLE 1

| | | Example 1 | Example 2 | Example 3 | Example 4 | Example 5 | Example 6 |
|---|---|---|---|---|---|---|---|
| | BaO + [SrO + CaO] | 48.8 | 47.1 | 44.9 | 47.6 | 51.3 | 48.7 |
| | $B_2O_3/(SiO_2 + Al_2O_3 + TiO_2)$ Molar Ratio | 1.00 | 0.88 | 0.75 | 0.83 | 1.23 | 1.24 |
| | ZnO | 0.0 | 0.0 | 0.0 | 0.0 | 0.0 | 5.0 |
| Characterization Data | Glass Flotation | O | O | O | O | O | O |
| | Presence or Absence of Void Generated | O | O | O | O | O | O |
| | Plating Resistance (μm/h) Ni Plating Solution | 0.1 | 0.1 | 0.1 | 0.1 | 0.1 | 0.1 |
| | Sn Plating Solution | 0.3 | 0.2 | 0.1 | 0.2 | 0.8 | 0.9 |
| | Rate of Flexural Crack Generation | 0/10 | 0/10 | 0/10 | 0/10 | 0/10 | 0/10 |
| Composition of Glass Composition [mol %] | $Na_2O$ | — | — | — | — | — | — |
| | CaO | 9.8 | 9.4 | 9.0 | 9.5 | 10.3 | 9.7 |
| | SrO | — | — | — | — | — | — |
| | BaO | 39.0 | 37.7 | 35.9 | 38.1 | 41.0 | 39.0 |
| | $B_2O_3$ | 25.6 | 24.7 | 23.6 | 23.8 | 26.9 | 25.6 |
| | $SiO_2$ | 12.2 | 11.8 | 11.2 | 20.3 | 12.8 | 12.2 |
| | $Al_2O_3$ | 13.4 | 12.9 | 12.4 | 8.3 | 9.0 | 8.5 |
| | ZnO | — | — | — | — | — | 5.0 |
| | $TiO_2$ | — | 3.5 | 7.9 | — | — | — |
| | Total | 100.0 | 100.0 | 100.0 | 100.0 | 100.0 | 100.0 |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| BaO + [SrO + CaO] | 45.0 | 40.1 | 36.8 | 54.0 | 30.0 | 43.0 | 44.4 |
| $B_2O_3/(SiO_2 + Al_2O_3 + TiO_2)$ Molar Ratio | 1.28 | 1.28 | 1.89 | 1.61 | 0.33 | 0.66 | 0.61 |
| ZnO | 12.1 | 21.6 | 26.5 | 0.0 | 5.0 | 0.0 | 0.0 |

TABLE 2-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Characterization Data | Glass Flotation | ○ | ○ | ○ | ○ | x | ○ | ○ |
|  | Presence or Absence of Void Generated | ○ | ○ | ○ | ○ | x | x | x |
|  | Plating Resistance (μm/h) Ni Plating Solution | 0.2 | 0.3 | 0.6 | 0.1 | 0.1 | 0.0 | 0.0 |
|  | Sn Plating Solution | 1.7 | 2.5 | 4.1 | 2.0 | 0.0 | 0.1 | 0.1 |
|  | Rate of Flexural Crack Generation | 1/10 | 1/10 | 5/10 | 2/10 | 0/10 | 0/10 | 0/10 |
| Composition of Glass Composition [mol %] | $Na_2O$ | — | — | — | — | 5.0 | — | — |
|  | CaO | 8.9 | 7.9 | 6.5 | 10.8 | — | 8.6 | 8.9 |
|  | SrO | 0.3 | 0.3 | 0.3 | — | — | — | — |
|  | BaO | 35.8 | 31.9 | 30.0 | 43.2 | 30.0 | 34.4 | 35.5 |
|  | $B_2O_3$ | 24.1 | 21.5 | 24.0 | 28.4 | 15.0 | 22.6 | 21.1 |
|  | $SiO_2$ | 11.3 | 10.1 | 8.5 | 13.5 | 40.0 | 10.8 | 26.7 |
|  | $Al_2O_3$ | 7.5 | 6.7 | 4.2 | 4.1 | 5.0 | 11.8 | 7.8 |
|  | ZnO | 12.1 | 21.6 | 26.5 | — | 5.0 | — | — |
|  | $TiO_2$ | — | — | — | — | — | 11.8 | — |
|  | Total | 100.0 | 100.0 | 100.0 | 100.0 | 100.0 | 100.0 | 100.0 |

As shown in Table 1, in the case of the samples according to Examples 1 to 6, which meet the requirements of the present invention, it has been confirmed that favorable results are achieved for all of the glass flotation, void generation, and flexure strength.

In addition, it has been confirmed that the plating resistance is not particularly problematic for any of the samples according to Examples 1 to 6, due to the fact that the dissolution rate in the Ni plating solution is favorably 0.1 μm/h or less, whereas the dissolution rate in the Sn plating solution is also favorably 1.0 μm/h or less.

As for the flexure strength, it has been confirmed that favorable results are achieved, due to the fact that the frequencies of crack generation are all 0/10 (no cracked sample among ten samples) in the test performed by keeping the samples warped up to 1.5 mm in accordance with the above-described test method JIS C 60068-2-21 for the flexural capacity of printed boards.

In contrast, in the case of the samples according to the comparative example, it has been confirmed that the plating resistance (the resistance in the Ni plating solution and the Sn plating solution) is defective in the case of the samples according to Comparative Examples 1 and 2 using the conductive pastes blended with the glass compositions with the ZnO content beyond the scope of the present invention, and the sample according to Comparative Example 3 using the conductive paste blended with the glass composition with the values of the ZnO content and molar ratio of $B_2O_2/(SiO_2+Al_2O_2+TiO_2)$ both beyond the scope of the present invention. Moreover, in the case of the samples according to Comparative Examples 2 and 3, flexural crack generation was confirmed.

In the case of the sample according to Comparative Example 4 using the conductive paste blended with the glass composition with the value of the molar ratio of $B_2O_2/(SiO_2+Al_2O_2+TiO_2)$ beyond the scope of the present invention, the resistance to the Ni plating solution was favorable, whereas the resistance to the Sn plating solution was defective, and flexural crack generation was confirmed.

In the case of the sample according to Comparative Example 5 using the conductive paste blended with the glass composition with the value of the molar ratio of $B_2O_2/(SiO_2+Al_2O_2+TiO_2)$ below the scope of the present invention, glass flotation and void generation found were confirmed to be unfavorable.

In the case of the samples according to Comparative Examples 6 and 7 using the conductive pastes blended with the glass compositions with the values of the molar ratios of $B_2O_2/(SiO_2+Al_2O_2+TiO_2)$ below the scope of the present invention, void generation found was confirmed to be unfavorable.

From the foregoing results, it has been confirmed that the use of the conductive paste containing the glass composition which meets the requirements of the present invention makes it possible to form external electrodes which have excellent plating resistance without glass flotation or voids, and multilayer ceramic capacitors which have excellent flexure strength are achieved by including external electrodes formed with the use of the conductive paste which meets the requirements of the present invention.

It is to be noted that while a case of manufacturing a multilayer ceramic capacitor with the use of the conductive paste according to the present invention has been described as an example in the embodiment, the conductive paste according to the present invention is able to be applied to various multilayer ceramic electronic components including electrodes within ceramic laminates, such as not only multilayer ceramic capacitors but also, for example, multilayer LC composite components and multilayer varistors.

The present invention is moreover not to be considered limited to the embodiment described above even in other respects, but various applications and modifications can be made within the scope of the invention.

DESCRIPTION OF REFERENCE SYMBOLS

1 ceramic layer
2 (2a, 2b) internal electrode
3a, 3b end surface of ceramic laminate (ceramic body)
4 (4a, 4b) external electrode
10 ceramic laminate (ceramic body)
11 external electrode body
12 Ni plating film layer
13 Sn plating film layer

The invention claimed is:

1. A conductive paste comprising:
   a conductive component; and
   a glass composition that contains:
   (a) BaO;
   (b) at least one of SrO and CaO;
   (c) ZnO;
   (d) $B_2O_3$; and
   (e) at least one selected from the group consisting of $SiO_2$, $Al_2O_3$, and $TiO_2$, wherein
   a total content percentage of BaO, SrO, and CaO is 44.9 mol % or more with respect to a total amount of the glass composition in the conductive paste,
   a molar ratio represented by $B_2O_3/(SiO_2+Al_2O_3+TiO_2)$ is 0.7 to 1.5, and
   a content percentage of ZnO is 0 to 5 mol % with respect to the total amount of the glass composition in the conductive paste.

2. The conductive paste according to claim 1, wherein the molar ratio represented by $B_2O_3/(SiO_2+Al_2O_3+TiO_2)$ is 0.7 to 1.0.

3. The conductive paste according to claim 1, wherein the glass composition contains 20 mol % or more of $B_2O_3$.

4. The conductive paste according to claim 2, wherein the glass composition contains 20 mol % or more of $B_2O_3$.

5. The conductive paste according to claim 1, further comprising a total of 1 mol % or less of one or more of $Li_2O$, $Na_2O$, $K_2O$, MgO, MnO, CoO, NiO, CuO, $SnO_2$, and $ZrO_2$.

6. The conductive paste according to claim 1, wherein the conductive component has an average particle size of 3 to 4 µm.

7. A multilayer ceramic electronic component comprising:
   a ceramic body having a plurality of alternately stacked dielectric layers and internal electrode layers; and
   an external electrode formed from the conductive paste according to claim 1 applied to a surface of the ceramic body.

8. The multilayer ceramic electronic component according to claim 7, further comprising a Ni plating film on the external electrode.

9. The multilayer ceramic electronic component according to claim 8, further comprising an Sn plating film on the Ni plating film.

* * * * *